(12) United States Patent
Slocum et al.

(10) Patent No.: US 7,818,220 B2
(45) Date of Patent: Oct. 19, 2010

(54) MANAGEMENT METHOD FOR SOURCED INVENTORY

(75) Inventors: Gregory Howard Slocum, Akron, OH (US); Susan Lynn Deevers, Clinton, OH (US); Roland James Simon, Richfield, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 1156 days.

(21) Appl. No.: 11/471,332

(22) Filed: Jun. 20, 2006

(65) Prior Publication Data

US 2008/0004997 A1    Jan. 3, 2008

(51) Int. Cl.
*G06Q 10/00* (2006.01)
(52) U.S. Cl. .......................................... 705/28; 705/22
(58) Field of Classification Search ................. 705/22, 705/28
See application file for complete search history.

(56) References Cited

U.S. PATENT DOCUMENTS

| | | | |
|---|---|---|---|
| 5,699,259 A * | 12/1997 | Colman et al. ............... 700/99 |
| 7,069,230 B2 * | 6/2006 | Krystek et al. ................. 705/9 |
| 7,212,976 B2 * | 5/2007 | Scheer ........................... 705/7 |
| 7,587,341 B2 * | 9/2009 | Wagner et al. ................ 705/26 |
| 2002/0072988 A1 * | 6/2002 | Aram ........................... 705/26 |
| 2007/0129985 A1 * | 6/2007 | Helmolt et al. ................ 705/8 |

* cited by examiner

*Primary Examiner*—Ramsey Refai
(74) *Attorney, Agent, or Firm*—Richard B. O'Planick

(57) ABSTRACT

A collaborative inventory management method for managing material inventory sourced by a customer from a plurality of suppliers includes: designating at least one supplier as a steady supplier to the customer; designating at least one second supplier as a lead supplier to the customer; allocating a supply split between the steady supplier and the lead supplier for supplying material to customer over a period of time; providing customer inventory level data (I) and usage forecast data (U) from the customer to the lead supplier; providing a customer shipment schedule to the steady supplier; providing an order create (OC) and ship notice (SN) from the steady supplier to the customer; transforming the (OC) and (SN) to contain selective quantity and date of shipment data (Q/D); sending Q/D data to the lead supplier; and planning by the lead supplier of shipments to manage (I) responsive to actual usage by the customer and shipment of material from the steady supplier to customer and in accordance with the supply split.

4 Claims, 4 Drawing Sheets

MANAGEMENT METHOD FOR SOURCED INVENTORY

FIELD OF THE INVENTION

The invention relates generally to a collaborative method of managing inventory and, more specifically, to a method of managing inventory between a plurality of independent suppliers.

BACKGROUND OF THE INVENTION

Traditionally, raw materials inventory has been managed by a buyer at a company monitoring inventory levels, projecting usage, and placing orders on suppliers to have shipments of the raw materials arrive in time to keep inventories within targeted levels. In order to cover uncertainties in usage and supply, the targeted levels tend to have a significant safety factor built into them. Certain vendor managed inventory methods have been developed that involve collaboration between the buyer, who regularly shares inventory information and usage forecast, and the supplier, who takes on the responsibility for shipping the materials in time to keep the inventories within targeted levels. Some of the known methods have achieved significant reduction of raw materials inventories at the consuming party without concomitant, and undesirable, increases in inventory levels to the supplying party.

While constituting an improvement, known collaborative methods cannot accommodate situations where there are a plurality of independent, and normally competitive, suppliers of the same raw material to the same consuming party location. Some attempts to address such situations have defined a standard split, such as 70/30 and reveal to each supplier the proportion of inventory and usage forecast according to that split. Each supplier then manages that split of the raw material flow to maintain the inventory within targeted levels. However, like stacking tolerances, such a division leads to higher variability in inventory levels. Moreover, such a division between suppliers results in a lack of clear responsibility on the part of suppliers for the overall inventory and shortages and disruptions may occur to the detriment of the consuming party.

Accordingly, industry is in need of a method of collaborative inventory management between a plurality of independent suppliers that is effective in providing a steady supply of raw material to a consuming party without excess inventory build up at either the supplier or the consuming party. A need exists for a method that further manages raw material inventory with minimal risk of shortages and disruption. Still further, the desired inventory method must satisfy the needs of the industry for a collaborative inventory management from a plurality of independent suppliers without compromising confidential and proprietary business information of the involved parties.

SUMMARY OF THE INVENTION

Pursuant to one aspect of the invention, a method of collaboratively managing the inventory of a material supplied by a plurality of otherwise independent and competing suppliers is provided. One or a plurality of suppliers are designated as the "Steady" supplier(s) and the other supplier(s) as "Lead" or "Swing" supplier(s). An allocation or split is made over a period of time (t) for the amount of material that each supplier is anticipated to supply. The Steady Supplier(s) is given a shipment schedule for (t) reflecting a steady supply level. The customer shares regularly inventory and usage forecast with the Lead Supplier(s). The Lead Supplier(s) manages shipments in order to maintain the inventory within target levels in spite of swings in usage. Information on shipping dates and quantities is shared between suppliers during (t). The Lead Supplier(s) calculates from the current inventory levels (I), the usage forecast (U), and the planned shipments (PS), from its co-supplier, what the inventory levels will be at some future date and plans its shipments in order to maintain the inventory level at targeted levels.

According to another aspect of the invention, the Lead Supplier may be given a projection of what the inventory levels will be at a future date based on the current level (I), the usage forecast (U), the shipments that are in transit, and the confirmed but not yet shipped orders from both the Lead and the Steady Supplier.

It is a further aspect of the invention to provide a method by which the Steady Supplier is given a ship schedule that the Steady Supplier should normally meet. The Lead Supplier is provided with inventory and usage forecast information. The Steady Supplier sends Order Create and Ship Notice Messages to the customer. To enable the Lead Supplier to see such information without compromising any other sensitive information, the customer receivers the messages from the Steady Supplier, transforms them to quantity and date of shipment information only, and sends the quantity and date of shipment information to the Lead Supplier. The Lead Supplier plans its shipments to manage the inventory around variations of usage as well as actual shipments from its co-supplier.

BRIEF DESCRIPTION OF THE DRAWINGS

The invention will be described by way of example and with reference to the accompanying drawings in which.

DETAILED DESCRIPTION OF THE INVENTION

Figure 1:
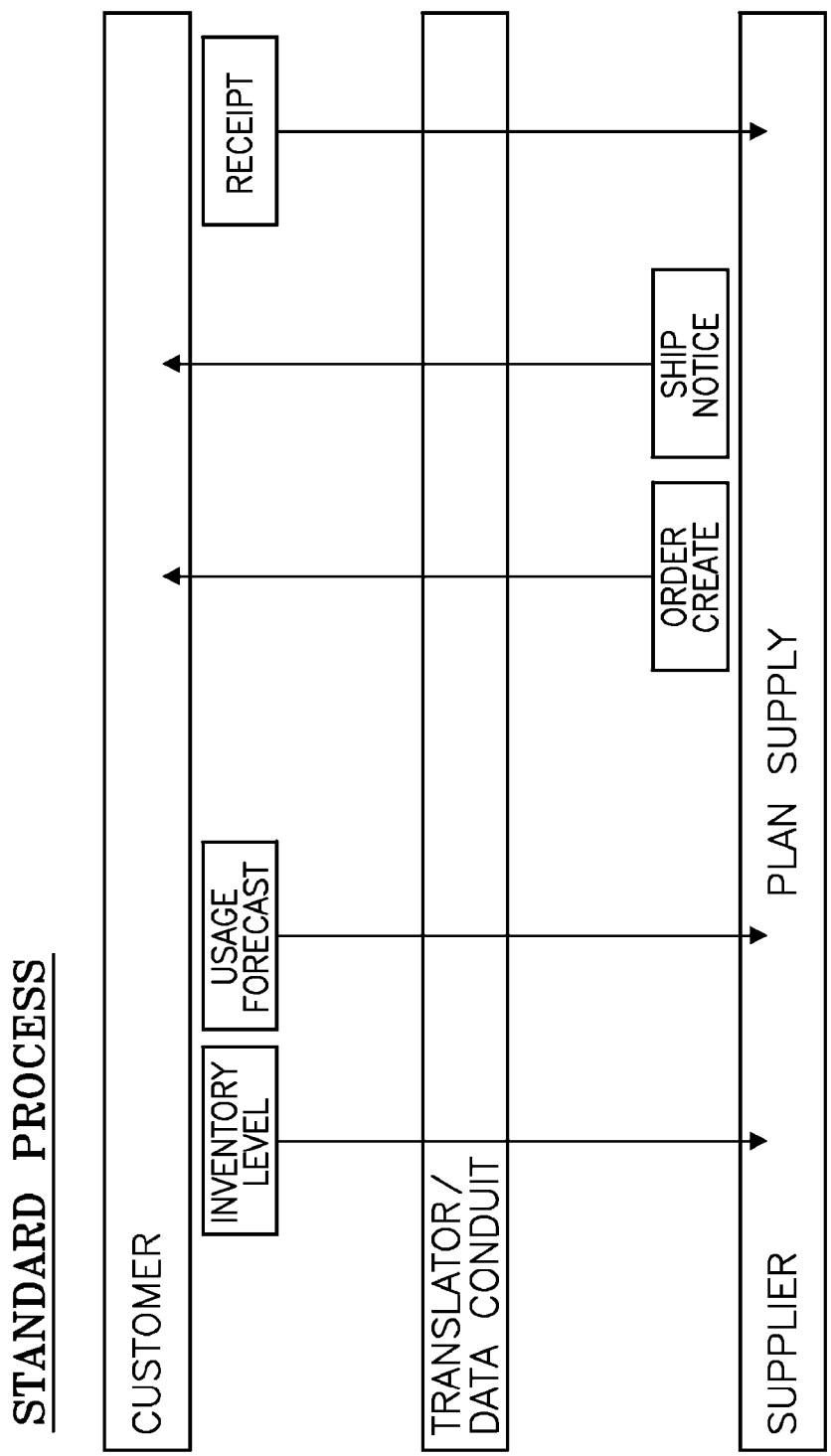
FIG. 1 is a chart of a prior art method of managing inventory of a material.

Referring initially to FIG. 1, an exemplary prior art material handling process 2 is shown. A customer 10 monitors material inventory, projected usage, and provides by means of a data conduit (such as a computer) to a supplier 14 inventory level data 16 and a usage forecast 18. The supplier 14 is then responsible for planning its supply of material so as to enable it to ship the necessary quantity of the material to the customer 10 in order to keep the customer's inventory within a targeted range or at a targeted level. In order in insure that the customer 10 does not confront a shortage, due to uncertainties in usage and supply, the targeted levels have tended to have a significant safety factor built into them. In certain conventional vendor managed inventory methods, collaboration between the buyer and the supplier occurs and the buyer shares inventory and usage data with the supplier and the supplier is responsible for shipping the materials in time to keep the inventories within the targeted range. The objective is to maintain material inventories of the supplier and customer at a lowest possible level without endangering the production capability of the customer from uncertainties inherent in business.

Such collaborative methods known in the industry, however, run into difficulties where there are two independent and normally competitive suppliers of the same raw material. The use of a plurality of suppliers may be a necessity where a sufficient quantity of material cannot be sourced from just one supplier or merely preferable on the part of the customer.

Figure 2:
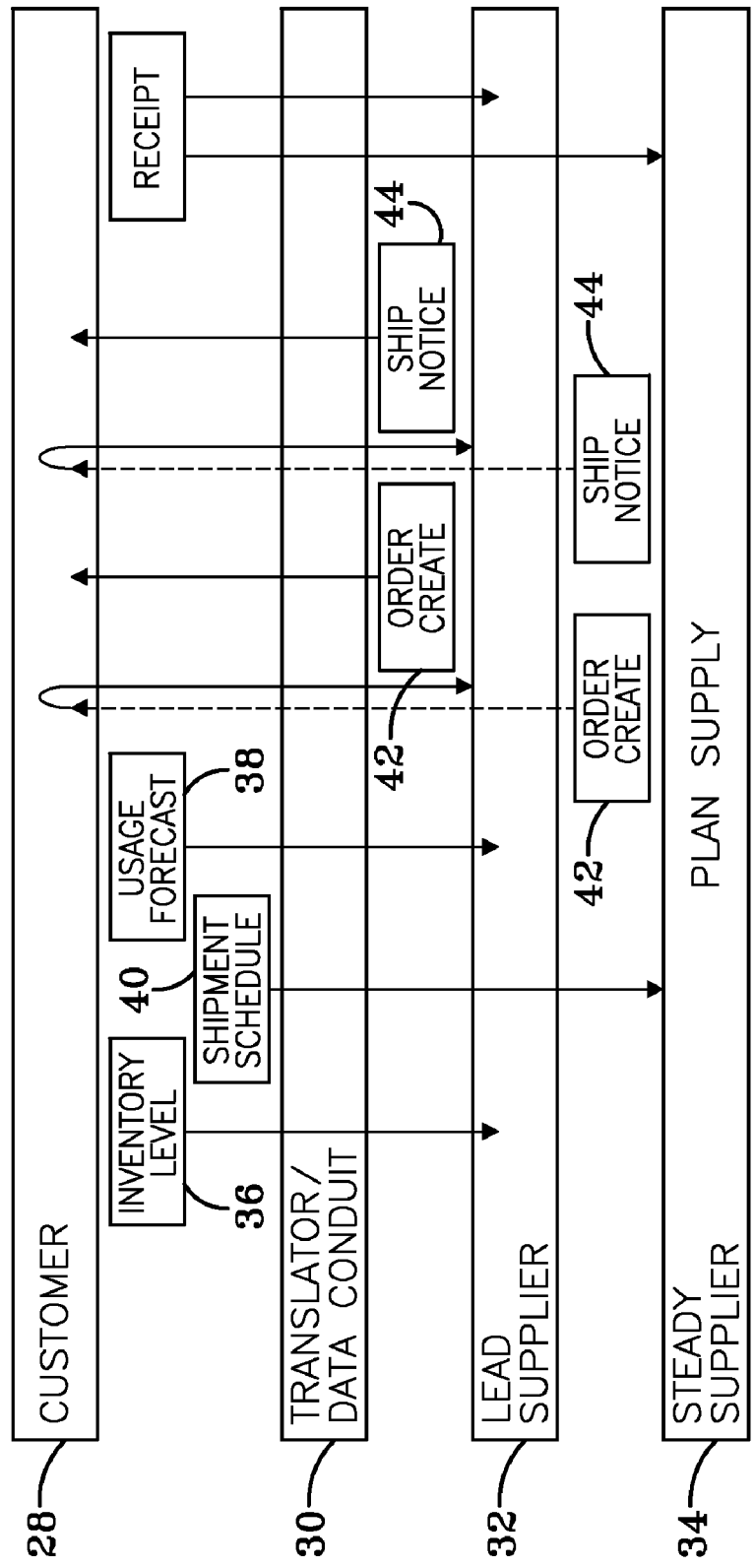
FIG. 2 is a chart of the method of collaborative managing inventory pursuant to the subject invention.

FIG. 2 illustrates the process of the subject invention. The method of collaboratively managing the inventory of a raw material or product to a customer 28 from two (or more) otherwise independent and competing suppliers 32, 34 is shown. A data conduit 30 between the customer 28 and each supplier 32, 34 allows for effective transmission of data between the parties as will be explained. While only two suppliers 32, 34 are identified, the principles of the subject invention can find application where the number of plural suppliers exceeds two. One or more (i.e. a plurality) of the suppliers, 32, is designated as the Lead Supplier(s) for the purpose of explanation herein while one or more (i.e. a plurality) of the other supplier(s) 34 is identified as the Steady Supplier(s). It will specifically be appreciated that a plurality of suppliers may be identified as steady suppliers and a plurality may be identified as lead suppliers if so desired. Throughout this description, lead supplier and steady supplier may be referred to as singular, it being understood that either or both may constitute a plurality if desired. An allocation or split of the total material/product requirements of the Customer 28 is made between suppliers 32, 34 over some period of time, such as a month. The split or allocation is the amount that each supplier is anticipated to supply. While the subject invention has particular application as a method for collaboratively managing raw material inventory between two or more independent suppliers, the methodology may also be employed in managing finished or work-in-process goods if desired.

The Lead Supplier 32 is given an inventory level data 36 and usage forecast data 38 from the Customer 28 on a regular (such as daily) basis, identified as period T. The Steady Supplier 34 is provided with a shipment schedule 40 for a longer period of time (referred to herein as T+Δt) such as a month reflecting a steady supply level. The Lead Supplier acts as a manager of the inventory (I) of Customer 28. In order for the Lead Supplier to manage the inventory, it must know not only about the inventory, forecast and receipts on its own shipments, but also the flow of other shipments (such as those from Steady Supplier 34) into the inventory (I) that Lead Supplier 32 is supposed to manage. To allow this, the Steady Supplier 34 is given a ship schedule 40 that the Steady Supplier 34 should normally meet. So that the Lead Supplier can manage actual versus scheduled shipments, the Steady Supplier 34 sends Order Create 42 and Ship Notice 44 messages to the Customer 28 via the data conduit 30.

The data conduit/translator 30, as used herein, may be a computer system or network. It is a practice in the industry for a consortium of companies, such as in the tire industry, to host electronic data transmission between such companies and their respective suppliers and translate each supplier company code into the partner company code. For example, one company may refer to Zinc Oxide as CODE 1 and its supplier may refer to the material by a string of numerical characters. Computer programs are in use whereby a translation of the code of the supplier into the code of the customer and vice-versa may be effected. Thus, the term "data conduit" as used herein is commonly a data processor such as a computer, its associate software, and a set of business rules between parties that, by agreement, govern the translation of code terminology of one party to that of another.

The Customer 28, in order to enable the Lead Supplier to see the Order Create 42 and Ship Notice 44 information of Steady Supplier 34 without compromising any other sensitive information, screens the data to exclude sensitive business information of the Steady Supplier. That is, the information received by the Customer 28 from Steady Supplier 34 is transformed by the Customer 28 to include only the information about the quantity and dates of the shipments by Steady Supplier 34. Such screened information is then sent via conduit 30 to the Lead Supplier 32. The Lead Supplier is then able to plan its shipments to manage the inventory around the ups and downs of customer usage as well as the shipments from his co-supplier, Steady Supplier 34.

The Lead Supplier 32 thus receives quantity and shipment date information received from Customer 28 that has been screened from order create 42 and ship notice 44 data received from Steady Supplier 34. The Lead Supplier can then calculate from the current inventory levels (I), what inventory levels will be at some future date and plan its shipments in order to maintain the inventory level at a predetermined target level. Accordingly, the Lead Supplier in the subject invention serves as an inventory manager, responsible for maintaining the inventory (I) of the Customer 28 at a target level through monitoring the status of co-supplier shipments. Optimally, the Lead Supplier will factor in shipments that are in transit but not received yet by the Customer 28 by means of the confirmed but not yet shipped orders from both the Lead and the Steady Suppliers 32, 34. Better management of the inventory (I) will require less of an inventory safety factor and reduce inventory costs for all of the parties.

Figure 3:
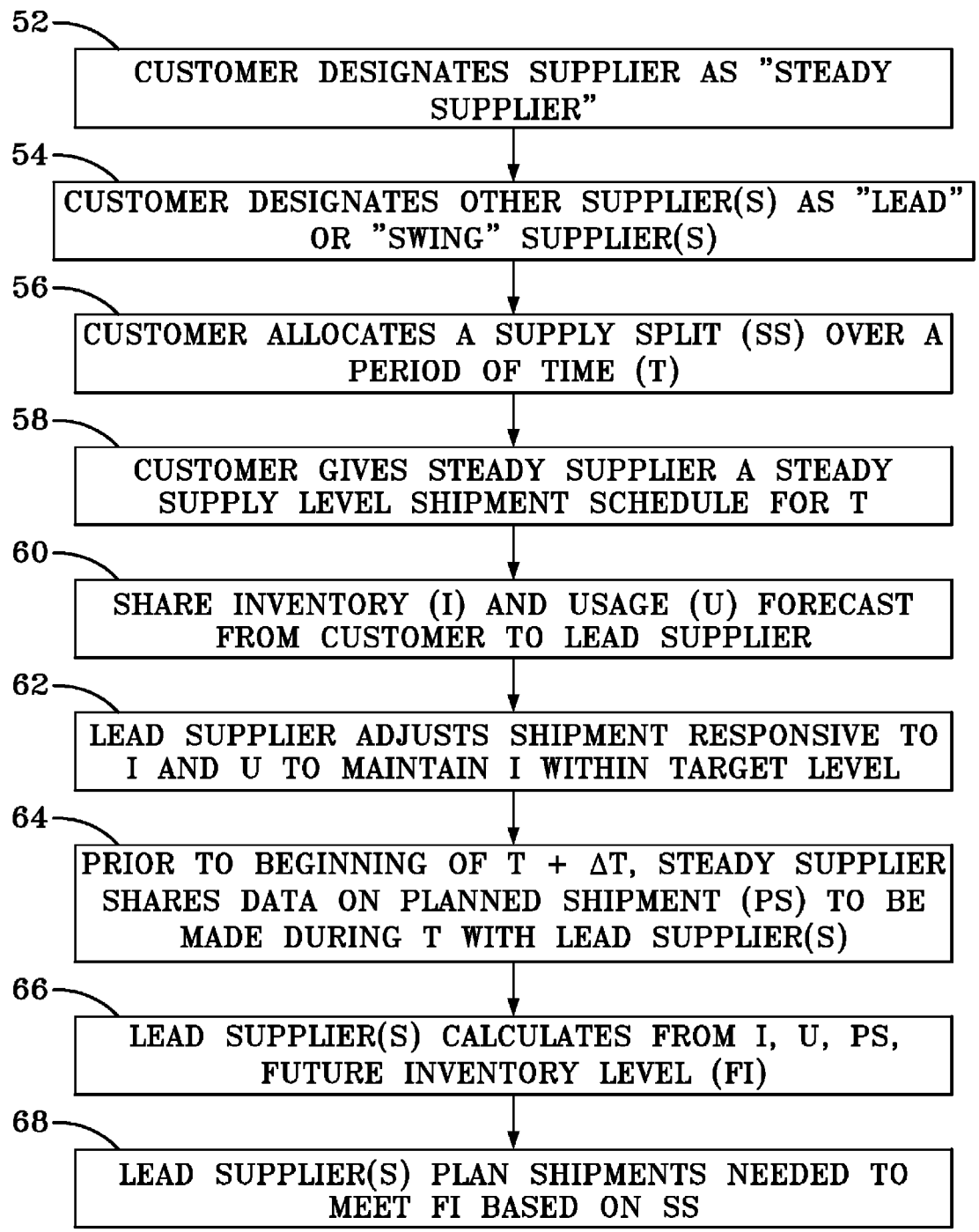
FIG. 3 is a block level diagram of the methodology of collaboratively managing inventory pursuant to the invention.

FIG. 3 illustrates in a block level diagram the subject collaborative inventory management process. The process begins by the designation 52 by the customer of one or more suppliers as a steady supplier. The customer also designates 54 other, otherwise competitor, suppliers as lead or swing suppliers. A split (percentage) 56 of the customer's material quantity requirements is made by the customer as to the steady supplier and the lead supplier. The customer gives 58 the steady supplier a steady supply level shipment schedule for a time period (T). The inventory (I) and usage (U) data of the customer is shared 60 with the lead supplier. Prior to the beginning of (T+Δt) the steady supplier shares 64 on planned shipments (PS) to be made during (T) with the lead supplier. Such date is routed through the customer who filters out sensitive business information of the steady supplier. The lead supplier calculates 66 from (I), (U), (PS), a future inventory level (FI) and plans 68 shipments needed to meet its percentage of (FI) according to the supply split (SS).

Figure 4:
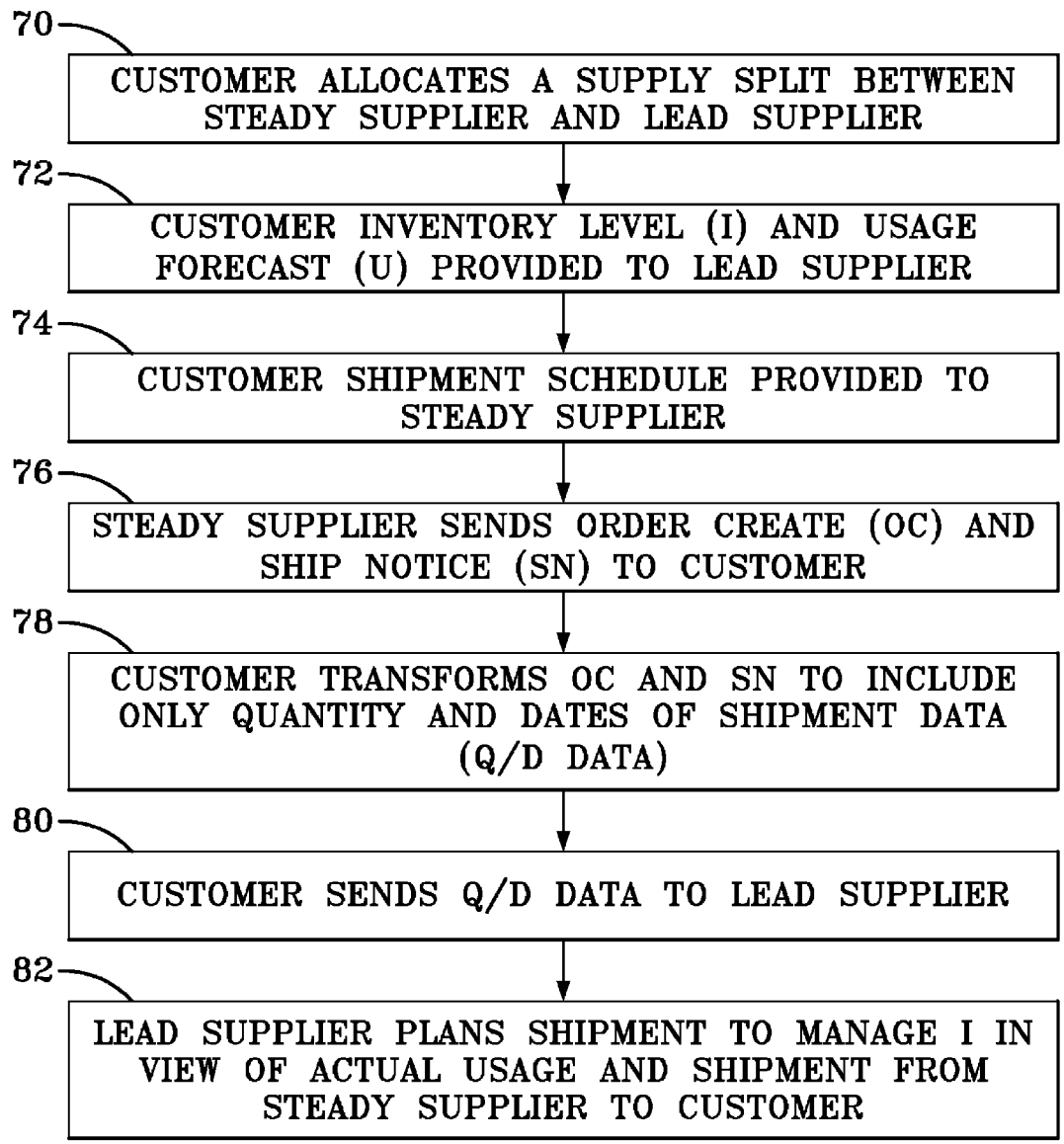
FIG. 4 is a block level diagram of the implementation of the methodology of the invention.

FIG. 4 illustrates in block level diagram form the implementation of the collaborative inventory management process. The customer allocates 70 a supply split (SS) between one or more steady suppliers and one or more lead suppliers. The customer inventory level (I) and usage forecast (U are provided 72 to the lead supplier on a regular basis, such as daily. The customer shipment schedule is provided 74 to the steady supplier. The steady supplier sends order create (OC) and ship notice (SN) to customer 76 who then transforms 78 such data by screening out business sensitive information of the steady supplier. Thusly screened quantity and shipment date data (Q/D data) is then sent 80 to the lead supplier who plans 82 its shipment of material so as to manage (I) in view of actual usage by customer and actual shipments from steady supplier to customer.

The above described process is an embodiment of the present invention but the invention is not intended to be so limited. Other applications and uses for the subject invention that will be apparent to those skilled in the art are intended to be within the scope of the invention. Terminology used in describing the process herein is intended to be for illustration only. Other terminology for steps in the process that may be utilized by practitioners of the invention may be employed without departure from the invention.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A collaborative inventory management method for managing material inventory sourced by a customer from a plurality of suppliers, comprising:
   a. designating at least one supplier as a steady supplier to the customer;
   b. designating at least one second supplier as a lead supplier to the customer;
   c. allocating a supply split between the steady supplier and the lead supplier for supplying material to customer over a period of time;
   d. providing customer inventory level data collected by use of inventory data processing equipment and usage forecast data collected by use of usage forecast data processing equipment from the customer to the lead supplier;
   e. providing a customer shipment schedule by use of readable shipment schedule generation equipment to the steady supplier;
   f. providing an order create and ship notice from the steady supplier to the customer;
   g. transforming the order create and ship notice to contain selective quantity and date of shipment data through use of data processing equipment;
   h. sending selective quantity and date of shipment data to the lead supplier through use of data transmission equipment; and
   i. planning by the lead supplier of shipments to manage inventory level data responsive to actual usage by the customer and shipment of material from the steady supplier to customer and in accordance with the supply split.

2. The method according to claim 1, wherein transforming the order create and ship notice to quantity and date of shipment data further comprises the step of selectively screening the data to exclude sensitive business information of the steady supplier.

3. The method according to claim 1, further comprising the step of transmitting a receipt from the customer to the lead supplier and the steady supplier for quantities of material received by the customer.

4. The method according to claim 1, wherein further comprising factoring in-transit shipment time between the steady supplier and the customer in the planning by the lead supplier of shipments necessary from the lead supplier to manage inventory level data.

\* \* \* \* \*